(12) United States Patent
Yang et al.

(10) Patent No.: US 11,087,647 B2
(45) Date of Patent: Aug. 10, 2021

(54) DETACHABLE FLEXIBLE DISPLAY STRUCTURES, FLEXIBLE DISPLAY SCREENS, METHODS OF MANUFACTURING THE SAME, AND DISPLAY DEVICES

(71) Applicant: Kunshan Go-Visionox Opto-Electronics Co., Ltd., Kunshan (CN)

(72) Inventors: Yang Yang, Kunshan (CN); Shanhe Wang, Kunshan (CN); Di Zhang, Kunshan (CN)

(73) Assignee: KUNSHAN GO-VISIONOX OPTO-ELECTRONICS CO., LTD., Kunshan (CN)

( * ) Notice: Subject to any disclaimer, the term of this patent is extended or adjusted under 35 U.S.C. 154(b) by 13 days.

(21) Appl. No.: 16/597,854

(22) Filed: Oct. 10, 2019

(65) Prior Publication Data
US 2020/0043387 A1 Feb. 6, 2020

Related U.S. Application Data

(63) Continuation of application No. PCT/CN2018/093759, filed on Jun. 29, 2018.

(30) Foreign Application Priority Data

Nov. 30, 2017 (CN) .......................... 201721644982.3

(51) Int. Cl.
G09F 9/30 (2006.01)
G06F 1/16 (2006.01)

(52) U.S. Cl.
CPC ............ *G09F 9/301* (2013.01); *G06F 1/1652* (2013.01)

(58) Field of Classification Search
CPC ....... G09F 9/301; G06F 1/1652; H05K 1/028; H05K 1/118; H05K 1/147
See application file for complete search history.

(56) References Cited

U.S. PATENT DOCUMENTS 10,147,903 B2 12/2018 Ando et al.
10,290,239 B2 5/2019 Liu
(Continued)

FOREIGN PATENT DOCUMENTS

CN 105679800 A 6/2016
CN 106129269 A 11/2016
(Continued)

OTHER PUBLICATIONS

TW Office Action dated May 28, 2019 in the corresponding TW application (application No. 107126497).
(Continued)

*Primary Examiner* — Hoa C Nguyen
(74) *Attorney, Agent, or Firm* — Kilpatrick Townsend & Stockton

(57) ABSTRACT

The present disclosure relates to a detachable flexible display structure, a flexible display screen, a method of manufacturing the same, and a display device. The detachable flexible display structure, having an active area and a non-active area arranged on outside of the active area, includes: a support substrate having a surface in the non-active area provided with a rib; and a flexible display screen formed on the support substrate and detachable from the support substrate. The flexible display screen is formed with an arch portion for covering the rib at a position corresponding to the rib so that the flexible display screen can be bent at the arch portion. The above detachable flexible display structure can reduce the stress generated at the arch portion when the flexible display screen is bent, so that it can prevent (Continued)

the peripheral metal trace from breaking, which improves the reliability of the flexible display.

18 Claims, 4 Drawing Sheets

(56) References Cited

U.S. PATENT DOCUMENTS

| | | | |
|---|---|---|---|
| 2015/0049428 A1* | 2/2015 | Lee | G06F 1/1652 361/679.27 |
| 2015/0313004 A1 | 10/2015 | Namkung et al. | |
| 2016/0081180 A1* | 3/2016 | Huitema | H01L 51/0097 361/749 |
| 2017/0040406 A1 | 2/2017 | Park et al. | |
| 2018/0081399 A1* | 3/2018 | Kwon | G06F 1/1652 |
| 2018/0090698 A1* | 3/2018 | Jeong | H01L 27/3276 |
| 2018/0108862 A1 | 4/2018 | Wang | |
| 2018/0364759 A1* | 12/2018 | Ahn | B32B 27/281 |

FOREIGN PATENT DOCUMENTS

| | | |
|---|---|---|
| CN | 106298858 A | 1/2017 |
| CN | 106340523 A | 1/2017 |
| CN | 106449695 A | 2/2017 |
| CN | 106898264 A | 6/2017 |
| CN | 107871762 A | 4/2018 |
| CN | 207517288 U | 6/2018 |
| TW | 201640466 A | 11/2016 |
| TW | 201701247 A | 1/2017 |
| WO | 2015032202 A1 | 3/2015 |
| WO | 2019105035 A1 | 6/2019 |

OTHER PUBLICATIONS

International Search Report dated Oct. 12, 2018 in the corresponding international application (PCT/CN2018/093759).

* cited by examiner

DETACHABLE FLEXIBLE DISPLAY STRUCTURES, FLEXIBLE DISPLAY SCREENS, METHODS OF MANUFACTURING THE SAME, AND DISPLAY DEVICES

CROSS-REFERENCES TO RELATED APPLICATIONS

This application is a continuation application for International Application PCT/CN2018/093759, filed on Jun. 29, 2018, which claims the priority benefit of Chinese Patent Application No. 201721644982.3, titled "DETACHABLE FLEXIBLE DISPLAY STRUCTURES, FLEXIBLE DISPLAY SCREENS, METHODS OF MANUFACTURING THE SAME, AND DISPLAY DEVICES" and filed on Nov. 30, 2017. The entireties of both applications are incorporated by reference herein for all purposes.

TECHNICAL FIELD

The present disclosure relates to the display technologies.

BACKGROUND

A display screen includes an active area (referred to as AA area) and a non-active area (non-AA area). In order to achieve certain functions, the non-active area may be required to be bendable. For example, in order to achieve a narrow frame, the non-active area is bent to the back of the screen to reduce the width of the frame.

SUMMARY

Based on above, in order to solve the problem that the peripheral metal traces are easy to break in the prior art, it is necessary to provide a detachable flexible display structure, a flexible display screen, a display device, and a manufacturing method of the flexible display screen, which are not easy to cause the breakage of the peripheral metal traces.

The present disclosure provides a detachable flexible display structure, wherein the detachable flexible display structure has an active area and a non-active area arranged on the outside of the active area;
the detachable flexible display structure includes:
a support substrate, the support substrate including a surface in the non-active area having a rib; and
a flexible display screen, the flexible display screen being formed on the support substrate and detachable from the support substrate; the flexible display screen being provided with an arch portion for covering the rib at a position corresponding to the rib, such that the flexible display screen being bendable at the arch portion.

The above detachable flexible display structure, after detaching the support substrate from the flexible display screen, can reduce the stress generated when the flexible display screen is bent at the arch portion due to the tendency of the arch portion to automatically bend, so that it is not easy to cause the peripheral metal trace to break, which improves the reliability of the flexible display.

In an embodiment, the rib has a height greater than a thickness of the flexible display screen.

In an embodiment, the rib has a semi-circular cross section.

In an embodiment, the rib has a radius between 1 mm and 5 mm.

In an embodiment, a ratio of a width of the arch portion to a width of the non-active area is between 1:10 and 1:2.

In an embodiment, the arch portion has a width between 2 mm and 10 mm and the non-active area has a width of 20 mm.

In an embodiment, the detachable flexible display structure further includes a driving circuit unit located in the non-active area; the driving circuit unit is arranged on the outside of the arch portion.

In an embodiment, the rib is located at a position of the support substrate corresponding to a central position of the non-active area.

In an embodiment, the flexible display screen includes:
a flexible substrate formed on the support substrate; and
a display unit formed on the flexible substrate.

In an embodiment, the flexible substrate is an ultra-thin glass.

In an embodiment, the ultra-thin glass has a thickness between 30 μm and 70 μm or between 0.1 mm and 0.2 mm.

The present disclosure also provides a flexible display screen having an active area and a non-active area arranged on the outside of the active area;
the flexible display screen is provided with an arch portion on a surface of the flexible display screen in the non-active area, such that the flexible display screen being bendable at the arch portion.

In an embodiment, the flexible display screen includes a flexible substrate and a display unit laminated; the display unit is formed on the flexible substrate.

In the above flexible display screen, since the arch portion has a tendency of automatic bending, the stress generated at the arch portion when the flexible display screen is bent can be reduced, so that it is not easy to cause the peripheral metal trace to break, which improves the reliability of the flexible display.

Further, the present disclosure also provides a display device including the above-described flexible display screen.

In the above display device, since the arch portion of the flexible display screen has a tendency of automatic bending, the stress generated at the arch portion when the flexible display screen is bent can be reduced, so that it is not easy to cause the peripheral metal trace to break, which improves the reliability of the flexible display.

The present disclosure also provides a method of manufacturing a flexible display screen which has a non-active area. The manufacturing method includes:
providing a support substrate;
providing a rib on a surface of the support substrate in the non-active area;
forming the flexible display screen on the support substrate provided with the rib, the flexible display screen being provided with an arch portion for covering the rib at a position corresponding to the rib, such that the flexible display screen being bendable at the arch portion; and
detaching the support substrate provided with the rib from the flexible display screen to obtain the detached flexible display screen.

In an embodiment, after the detaching the support substrate provided with the rib from the flexible display screen to obtain the detached flexible display screen, the method further includes:
providing a driving circuit unit in the non-active area of the detached flexible display screen, the driving circuit unit being arranged on the outside of the arch portion.

In an embodiment, the flexible display screen includes a flexible substrate and a display unit laminated, the display unit is formed on the flexible substrate, and the flexible substrate is formed on the support substrate.

In an embodiment, the providing a rib on a surface of the support substrate in the non-active area includes providing the rib on the surface of the support substrate in the non-active area by pressing.

In an embodiment, the forming the flexible display screen on the support substrate provided with the rib includes forming the flexible display screen on the support substrate provided with the rib by a deposition process.

In an embodiment, the flexible display screen has an active area, and the rib is disposed at a position of the support substrate adjacent to the active area.

In an embodiment, the support substrate is a rigid substrate.

DETAILED DESCRIPTION OF THE INVENTION

As mentioned above, displays often include both active and non-active areas. However, for the current display screens, during the bending process of the non-active area, the peripheral metal traces in the non-active area are easy to break, thereby causing poor display of the screen body of the display screen.

The specific embodiments of the present disclosure will be described in detail below with reference to the accompanying drawings. In the following description, numerous specific details are set forth in order to provide a thorough understanding of the disclosure. However, the present disclosure can be implemented in many other ways than those described herein, and those skilled in the art can make similar modifications without departing from the scope of the present disclosure, and thus the present disclosure is not limited by the specific embodiments disclosed below.

Figure 1:
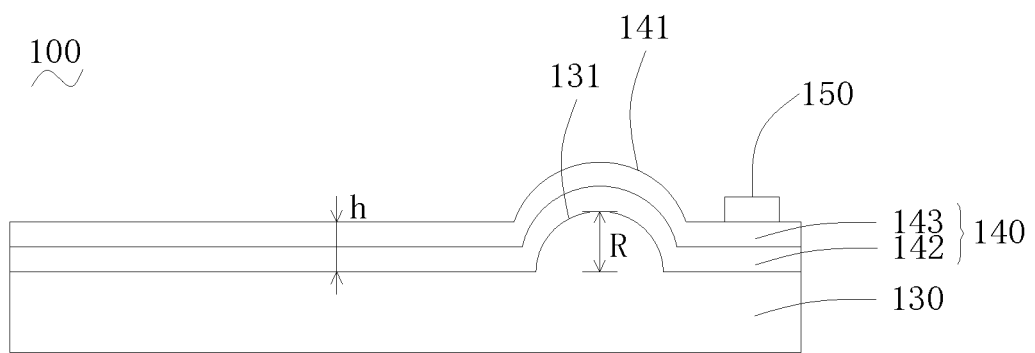
FIG. 1 is a schematic structural view illustrating a detachable flexible display structure according to an embodiment.
Figure 2:
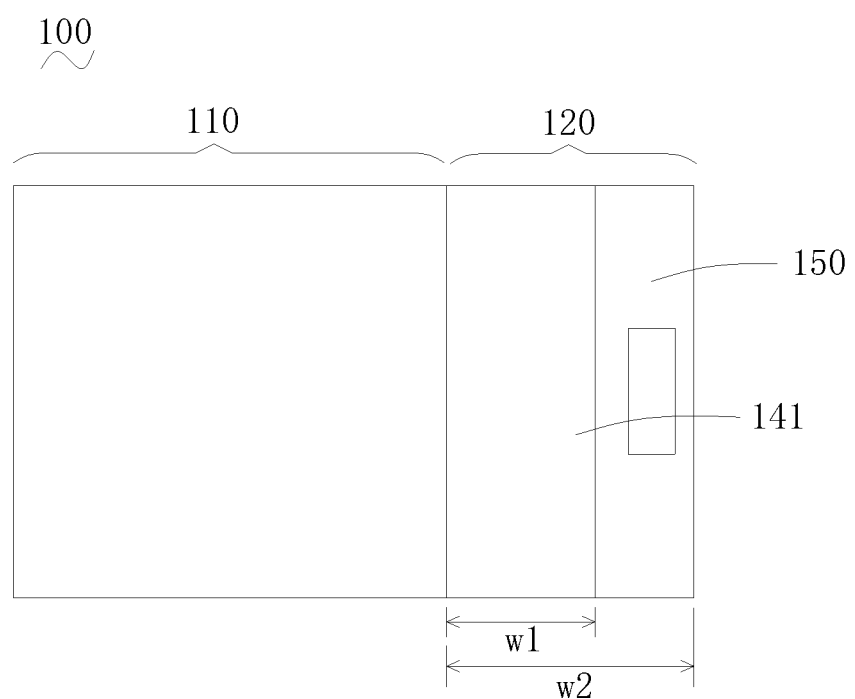
FIG. 2 is a schematic plan view illustrating a detachable flexible display structure according to an embodiment.

Referring to FIGS. 1 and 2, the detachable flexible display structure 100 of an embodiment has an active area 110 and a non-active area 120 arranged on the outside of the active area 110.

The non-active area 120 (i. e., the non-AA area) is located in a peripheral area of the detachable flexible display structure 100. Peripheral metal traces (not shown) for transmitting signals may be provided in the non-active area 120. The non-active area 120 includes, but is not limited to, the above-mentioned peripheral metal traces.

In the present disclosure, the detachable flexible display structure 100 includes a support substrate 130 and a flexible display screen 140.

The surface of the support substrate 130 on the non-active area 120 has a rib 131. A rigid substrate is typically employed as the support substrate 130, such as a glass substrate. The rib 131 extends in a direction in which the flexible display screen 140 can be bent.

Furthermore, the support substrate 130 may comprise one layer or more than one layers. When the support substrate 130 is consisted of two or more layers, the materials of the respective sub-layers of the support substrate 130 may be the same or different. For example, the support substrate 130 may include a first sub-layer and a second sub-layer which are laminated. Preferably, the material of the first sub-layer is glass, and the material of the second sub-layer is photoresist. Each sub-layer can also be other materials. The flexible display screen 140 is formed on the support substrate 130 and is detachable from the support substrate 130. The flexible display screen 140 is formed with an arch portion 141 enclosing the rib 131 at a position corresponding to the rib 131 such that the flexible display screen 140 can be bent at the arch portion 141.

In the present disclosure, the flexible display screen 140 may include a flexible substrate 142 and a display unit 143 which are laminated. The flexible substrate 142 is formed on the support substrate 130. The display unit 143 is formed on the flexible substrate 142. The structure of the flexible display screen 140 is not limited thereto. The flexible display screen may also include other functional film layers, such as encapsulation layers.

Based on the foregoing embodiments, the flexible substrate 142 may be ultra-thin glass. The ultra-thin glass has a certain degree of stiffness and has the function of supporting the display unit 143. At the same time, the ultra-thin glass has a certain toughness and is favorable for bending.

Preferably, the thickness of the ultra-thin glass may be from 0.1 mm to 2 mm. More preferably, the ultra-thin glass may have a thickness of 30 μm to 70 μm.

Based on the foregoing embodiments, the height of the rib 131 (R in the present embodiment, as shown in FIG. 1) is larger than the thickness h of the flexible display 140. The purpose is to make the curvature of the arch portion 141 formed on the rib 131 larger, so that the tendency of automatic bend of the flexible display screen 140 is increased after the flexible display screen 140 is detached from the support substrate 130, which is beneficial to reduce bending stress to a great degree.

Based on the foregoing embodiments, the rib 131 may have a semicircular cross section. Since the rib 131 has a semicircular cross section and the radius of curvature of each point on the semicircle is the same, the radius of curvature on the inner wall of the arch portion 141 formed on the rib 131 is the same. It is advantageous to make the subsequent flexible display screen 140 be automatically bent at the arch portion 141 to be uniform, so that the bending stress distribution is uniform, which avoids breaking due to the excessive partial bending stress.

Based on the foregoing embodiments, the radius of the rib 131 may range from 1 mm to 5 mm. When the radius of the rib 131 is from 1 mm to 5 mm, the flexible display screen is naturally bent after being detached from the support substrate, thereby reducing the artificial bending stress.

It should be noted that the cross-sectional shape of the rib 131 is not limited thereto. It can also be set according to the actual situation, as long as the rib 131 has a certain curvature.

Based on the foregoing embodiments, the ratio of the width w1 of the arch portion 141 to the width w2 of the non-active area 120 may be from 1:10 to 1:2. Preferably, the width w1 of the arch portion 141 may be from 2 mm to 10 mm, and the width w2 of the non-active area 120 may be 20 mm. In this way, the bending can be realized in the non-active area 120, and the driving circuit unit 150 can be fixed in the non-active area 120 at the same time.

Based on the foregoing embodiments, the rib 131 may be disposed adjacent to the active area 110, as shown in FIGS.

1 and 2. Correspondingly, the arch portion 141 can also be disposed adjacent to the active area 110. Thus, after the flexible display screen 140 is bent at the arch portion 141 subsequently, some of the components of the non-active area 120 are located on the side (bending portion) of the flexible display screen 140, while the remaining portions are located on the back side of the flexible display screen 140. The screen ratio of the effective active area in the flexible display 140 can be increased.

The position of the rib 131 is not limited thereto, and may be located at other positions of the non-active area 120, such as a central position. The detachable flexible display structure 100 may further include a driving circuit unit 150 located in the non-active area 120 on the basis of the foregoing embodiments. The driving circuit unit 150 is arranged on outside of the arch portion 141. Therefore, at least a portion of the peripheral metal trace for transmitting signals and power between the active area 110 and the driving circuit unit 150 is located at the arch portion 141. Since the arch portion 141 causes the flexible display screen 140 to be automatically bent after the flexible display screen 140 is detached from the support substrate 130, the bending stress is reduced, so that the peripheral metal trace is not easily broken and fails.

The above detachable flexible display structure, after detaching the support substrate from the flexible display screen, can reduce the stress generated when the flexible display screen is bent at the arch portion due to the tendency of the arch portion to automatically bend, so that it is not easy to cause the peripheral metal trace to break, which improves the reliability of the flexible display.

Figure 3:
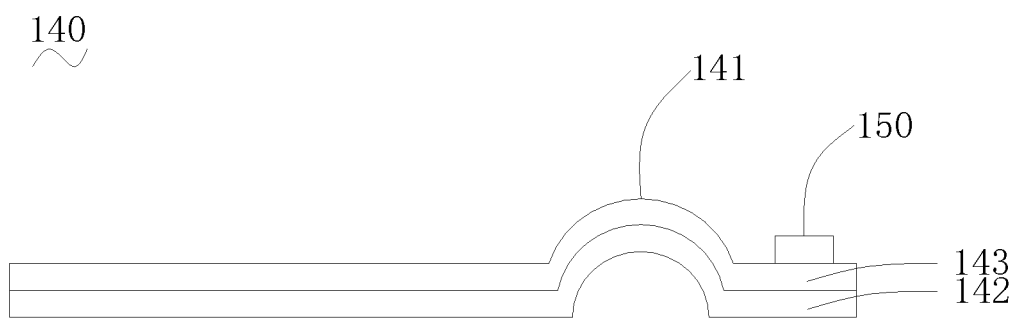
FIG. 3 is a schematic structural view illustrating a flexible display screen before being bent according to an embodiment.
Figure 4:
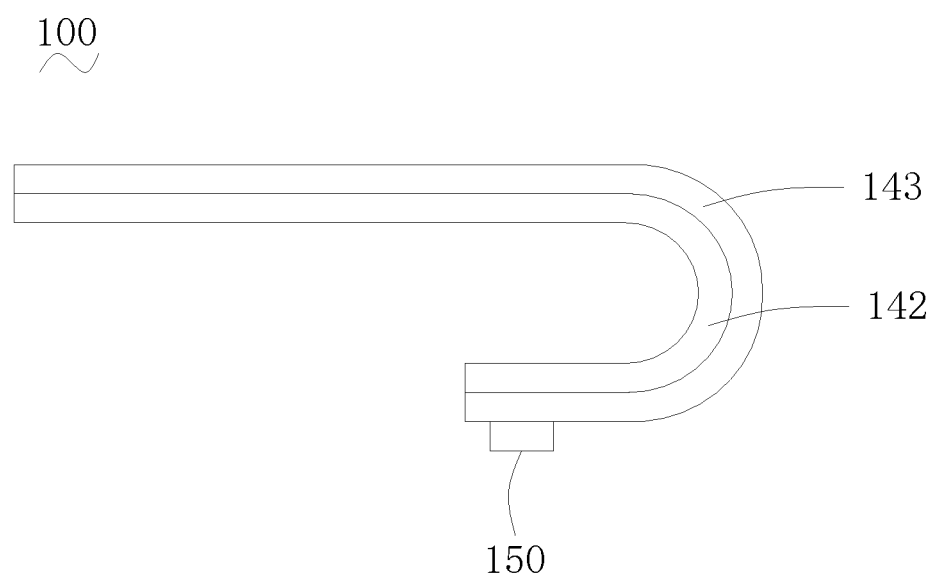
FIG. 4 is a schematic structural view illustrating a flexible display screen after being bent according to an embodiment.

Referring to FIGS. 3 and 4, the flexible display screen 140 of an embodiment has an active area 110 and a non-active area 120 arranged on outside of the active area 110.

The flexible display screen 140 is formed with an arch portion 141 on the surface of the non-active area 120 so that the flexible display screen 140 can be bent at the arch portion 141.

Based on the foregoing embodiments, the flexible display screen 140 may include a laminated flexible substrate 142 and a display unit 143. The flexible substrate 142 is formed on the support substrate 130. The display unit 143 is formed on the flexible substrate 142. The structure of the flexible display screen 140 is not limited thereto. The flexible display screen may also include other functional film layers, such as encapsulation layers.

In the above flexible display screen, since the arch portion has a tendency of automatic bending, the stress generated when the flexible display screen is bent at the arch portion can be reduced, so that it is not easy to cause the peripheral metal trace to break, which improves the reliability of the flexible display.

A method of manufacturing a flexible display screen according to an embodiment includes:

S10, support substrate 130 is provided.

A rigid substrate is typically employed as the support substrate 130, such as a glass substrate. At this time, the surface of the support substrate 130 is a flat surface.

S20, the flexible display screen has a non-active area 120, and a rib 131 is formed on a surface of the support substrate 130 on the non-active area 120 to obtain a support substrate 130 with the rib 131.

The rib 131 may be formed on the surface of the support substrate 130 on the non-active area 120 by pressing. For example, a mold defining a groove having a surface corresponding to the shape of the rib 131 is employed, and the mold is pressed against the support substrate 130 under a certain temperature condition, so that the rib 131 may be formed on a surface of the support substrate 130 on the non-active area 120.

Referring to FIG. 2 together, the rib 131 of the present embodiment may be disposed at a position of the support substrate 130 near the active area 110. The position of the rib 131 is not limited thereto, and may be located at a position corresponding to other positions of the support substrate 130 on the non-active area 120, for example, a central position.

S30, forming a flexible display screen 140 on the support substrate 130 with the rib 131. The flexible display screen 140 is formed with an arch portion 141 enclosing the rib 131 at a position corresponding to the rib 131 so that the flexible display screen 140 can be bent at the arch portion 141.

The flexible display screen 140 may be formed on the support substrate 130 with the rib 131 by a deposition process etc.

Referring to FIG. 2 together, the arch portion 141 of the present embodiment can be disposed adjacent to the active area 110. The position of the arch portion 141 is not limited thereto, and may be located at other positions of the non-active area 120, such as a central position.

S40, detaching the support substrate 130 from the flexible display screen 140 to obtain a flexible display screen 140.

Referring to FIG. 3 together, after the support substrate 130 is detached from the flexible display screen 140, the flexible display screen 140 may also be provided with the driving circuit unit 150 in the non-active area 120. The driving circuit unit 150 is arranged on outside of the arch portion 141.

In the present embodiment, the flexible display screen 140 may include a laminated flexible substrate 142 and a display unit 143.

Referring to FIG. 4, after the support substrate 130 is detached from the flexible display screen 140, the flexible display screen 140 is naturally bent. The arch portion 141 is located at the edge of the flexible display screen 140, and the side where the driving circuit unit 150 is located is bent downward to below the active area 110

In the above manufacturing method of the flexible display screen, since the arch portion has a tendency of automatic bending, the stress generated when the flexible display screen is bent at the arch portion can be reduced, so that it is not easy to cause the peripheral metal trace to break, which improves the reliability of the flexible display.

Further, the present disclosure also provides a display device including the above-described flexible display screen. The display device may be a mobile phone, a tablet computer or the like.

In the above display device, since the arch portion of the flexible display screen has a tendency of automatic bending, the stress generated when the flexible display screen is bent at the arch portion can be reduced, so that it is not easy to cause the peripheral metal trace to break, which improves the reliability of the flexible display.

The technical features of the above-described embodiments may be arbitrarily combined. For the sake of brevity of description, all possible combinations of the technical features in the above embodiments are not described. However, as long as there is no contradiction between the combinations of these technical features, all should be considered as the scope of this specification.

The above-mentioned embodiments are merely illustrative of several embodiments of the present disclosure, and the description thereof is not to be construed as limiting the scope of the disclosure. It should be noted that a number of variations and modifications may be made by those skilled in the art without departing from the scope of the present disclosure. Therefore, the scope of the invention should be determined by the appended claims.

The invention claimed is:

1. A detachable flexible display structure, having an active area and a non-active area arranged on outside of the active area, and comprising:
 a support substrate, including a surface in the non-active area having a rib; and
 a flexible display screen, formed on the support substrate and being detachable from the support substrate, the flexible display screen including an arch portion for covering the rib at a position corresponding to the rib, the flexible display screen being bendable at the arch portion.

2. The detachable flexible display structure according to claim 1, wherein the rib includes a height greater than a thickness of the flexible display screen.

3. The detachable flexible display structure according to claim 1, wherein the rib includes a semi-circular cross section.

4. The detachable flexible display structure according to claim 3, wherein the rib includes a radius between 1 mm and 5 mm.

5. The detachable flexible display structure according to claim 1, wherein a ratio of a width of the arch portion to a width of the non-active area is between 1:10 and 1:2.

6. The detachable flexible display structure according to claim 1, wherein the arch portion has a width between 2 mm and 10 mm and the non-active area has a width of 20 mm.

7. The detachable flexible display structure according to claim 1, wherein the detachable flexible display structure further comprises a driving circuit unit located in the non-active area; the driving circuit unit being arranged on outside of the arch portion.

8. The detachable flexible display structure according to claim 1, wherein the rib is located at a position of the support substrate corresponding to a central position of the non-active area.

9. The detachable flexible display structure according to claim 1, wherein the flexible display screen comprises:
 a flexible substrate formed on the support substrate; and
 a display unit formed on the flexible substrate.

10. The detachable flexible display structure according to claim 9, wherein the flexible substrate comprises an ultra-thin glass, wherein the ultra-thin glass is characterized by a thickness between 30 μm and 70 μm or between 0.1 mm and 0.2 mm.

11. The detachable flexible display structure according to claim 1, wherein the rib has a semicircular cross section and a radius of curvature of each point on the semicircle is the same.

12. The detachable flexible display structure according to claim 1, wherein a radius of curvature on an inner wall of the arch portion formed on the rib is the same.

13. A method of manufacturing a flexible display screen having a non-active area, comprising:
 providing a support substrate;
 providing a rib on a surface of the support substrate in the non-active area;
 forming the flexible display screen on the support substrate provided with the rib, the flexible display screen being provided with an arch portion for covering the rib at a position corresponding to the rib, such that the flexible display screen being bendable at the arch portion; and
 detaching the support substrate provided with the rib from the flexible display screen to obtain a detached flexible display screen.

14. The method of manufacturing the flexible display screen according to claim 13, wherein after the detaching the support substrate provided with the rib from the flexible display screen to obtain the detached flexible display screen, the method further comprises:
 providing a driving circuit unit in the non-active area of the detached flexible display screen, the driving circuit unit being arranged on outside of the arch portion.

15. The method of manufacturing the flexible display screen according to claim 13, wherein the flexible display screen comprises a flexible substrate and a display unit laminated, the display unit is formed on the flexible substrate, and the flexible substrate is formed on the support substrate.

16. The method of manufacturing the flexible display screen according to claim 13, wherein the providing a rib on a surface of the support substrate in the non-active area comprises providing the rib on the surface of the support substrate in the non-active area by pressing.

17. The method of manufacturing the flexible display screen according to claim 13, wherein the forming the flexible display screen on the support substrate provided with the rib comprises forming the flexible display screen on the support substrate provided with the rib by a deposition process.

18. The method of manufacturing the flexible display screen according to claim 13, wherein the flexible display screen has an active area, and the rib is disposed at a position of the support substrate adjacent to the active area.

* * * * *